United States Patent
Lu et al.

(10) Patent No.: US 6,654,674 B2
(45) Date of Patent: Nov. 25, 2003

(54) ENHANCED SYSTEM FOR YAW STABILITY CONTROL SYSTEM TO INCLUDE ROLL STABILITY CONTROL FUNCTION

(75) Inventors: Jianbo Lu, Livonia, MI (US); Todd Allen Brown, Dearborn, MI (US); Joseph Carr Meyers, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/174,926

(22) Filed: Jun. 19, 2002

(65) Prior Publication Data

US 2003/0100979 A1 May 29, 2003

Related U.S. Application Data

(60) Provisional application No. 60/332,063, filed on Nov. 21, 2001.

(51) Int. Cl.[7] .................................................. G06F 7/00
(52) U.S. Cl. .............................. 701/36; 701/41; 701/37; 701/38; 701/72
(58) Field of Search ............................... 701/36, 37, 38, 701/41, 70, 1, 72, 78, 83; 180/197; 303/146, 166, 189

(56) References Cited

U.S. PATENT DOCUMENTS

| | | |
|---|---|---|
| 2,917,126 A | 12/1959 | Phillips |
| 3,608,925 A | 9/1971 | Murphy |
| 3,948,567 A | 4/1976 | Kasselmann et al. |
| 3,972,543 A | 8/1976 | Presley et al. |
| 4,023,864 A | 5/1977 | Lang et al. |
| RE30,550 E | 3/1981 | Reise |
| 4,480,714 A | 11/1984 | Yabuta et al. |
| 4,592,565 A | 6/1986 | Eagle |
| 4,809,183 A | 2/1989 | Eckert |
| 4,898,431 A | 2/1990 | Karnopp et al. |
| 4,964,679 A | 10/1990 | Rath |
| 4,976,330 A | 12/1990 | Matsumoto |

(List continued on next page.)

FOREIGN PATENT DOCUMENTS

| | | |
|---|---|---|
| DE | 36 16 907 | 11/1987 |
| DE | 38 15 938 | 11/1989 |
| DE | 43 21 571 | 1/1994 |
| DE | 42 27 886 | 2/1994 |
| DE | 42 28 893 | 3/1994 |
| DE | 43 35 979 | 4/1995 |

(List continued on next page.)

OTHER PUBLICATIONS

*A Method For Reducing On–Road Rollovers—Anti–Rollover Braking*, Thomas J. Wielenga, Dynamotive, L.L.C., International Congress and Exposition, Detroit, Michigan, Mar. 1–4, 1999.

Primary Examiner—Richard M. Camby
(74) Attorney, Agent, or Firm—Gary A. Smith; Artz & Artz

(57) ABSTRACT

A yaw stability control system (18) is enhanced to include roll stability control function for an automotive vehicle and includes a plurality of sensors (28–39) sensing the dynamic conditions of the vehicle. The sensors may include a speed sensor (20), a lateral acceleration sensor (32), a yaw rate sensor (28) and a longitudinal acceleration sensor (36). The controller (26) is coupled to the speed sensor (20), the lateral acceleration sensor (32), the yaw rate sensor (28) and a longitudinal acceleration sensor (36). The controller (26) generates both a yaw stability feedback control signal and a roll stability feedback control signal. The priority of achieving yaw stability control or roll stability control is determined through priority determination logic. If a potential rollover event is detected, the roll stability control will take the priority. The controller for roll stability control function determines a roll angle of the vehicle from the lateral acceleration sensor signal and calculates the feedback control signal based on the roll angle.

20 Claims, 3 Drawing Sheets

U.S. PATENT DOCUMENTS

| | | | |
|---|---|---|---|
| 4,998,593 A | 3/1991 | Karnopp et al. | |
| 5,089,967 A | 2/1992 | Haseda et al. | |
| 5,224,765 A | 7/1993 | Matsuda | |
| 5,335,176 A | 8/1994 | Nakamura | |
| 5,408,411 A | 4/1995 | Nakamura et al. | |
| 5,446,658 A | 8/1995 | Pastor et al. | |
| 5,610,575 A | 3/1997 | Gioutsos | |
| 5,634,698 A | 6/1997 | Cao et al. | |
| 5,640,324 A | 6/1997 | Inagaki | |
| 5,671,982 A | 9/1997 | Wanke | |
| 5,707,117 A | 1/1998 | Hu et al. | |
| 5,707,120 A | 1/1998 | Monzaki et al. | |
| 5,732,378 A | 3/1998 | Eckert et al. | |
| 5,732,379 A | 3/1998 | Eckert et al. | |
| 5,737,224 A | 4/1998 | Jeenicke et al. | |
| 5,742,918 A | 4/1998 | Ashrafi et al. | |
| 5,762,406 A | 6/1998 | Yasui et al. | |
| 5,782,543 A | 7/1998 | Monzaki et al. | |
| 5,809,434 A | 9/1998 | Ashrafi et al. | |
| 5,825,284 A | 10/1998 | Dunwoody et al. | |
| 5,857,535 A | 1/1999 | Brooks | |
| 5,869,943 A | 2/1999 | Nakashima et al. | |
| 5,890,084 A | 3/1999 | Halasz et al. | |
| 5,893,896 A | 4/1999 | Imamura et al. | |
| 5,931,546 A | 8/1999 | Nakashima et al. | |
| 6,002,974 A | 12/1999 | Schiffmann | |
| 6,002,975 A | 12/1999 | Schiffmann et al. | |
| 6,038,495 A | 3/2000 | Schiffmann | |
| 6,065,558 A | 5/2000 | Wielenga | |
| 6,263,261 B1 * | 7/2001 | Brown et al. | 701/1 |
| 6,324,446 B1 * | 11/2001 | Brown et al. | 701/1 |
| 6,332,104 B1 * | 12/2001 | Brown et al. | 701/1 |
| 6,338,012 B2 * | 1/2002 | Brown et al. | 701/1 |
| 6,496,758 B2 * | 12/2002 | Rhode et al. | 701/38 |
| 2001/0008986 A1 | 7/2001 | Brown et al. | |

FOREIGN PATENT DOCUMENTS

| | | |
|---|---|---|
| DE | 196 02 879 | 8/1997 |
| DE | 197 51 867 | 5/1999 |
| DE | 197 51 891 | 5/1999 |
| DE | 197 51 925 | 5/1999 |
| DE | 197 51 935 | 5/1999 |
| DE | 198 02 041 | 7/1999 |
| DE | 199 07 633 | 10/1999 |
| DE | 197 51 839 | 5/2000 |
| EP | 0 721 877 A1 | 7/1996 |
| EP | 0758601 | 2/1997 |
| EP | 0 827 852 A2 | 3/1998 |
| FR | 24 25 342 | 12/1979 |
| GB | 2257403 | 1/1993 |
| GB | 2316455 | 2/1998 |
| JP | 63116918 | 5/1988 |
| JP | 63151539 | 6/1988 |
| JP | 63203456 | 8/1988 |
| JP | 1101238 | 4/1989 |
| JP | 2171373 | 7/1990 |
| JP | 3042360 | 2/1991 |
| JP | 3045452 | 2/1991 |
| JP | 4008837 | 1/1992 |
| JP | 5016699 | 1/1993 |
| JP | 5254406 | 10/1993 |
| JP | 6278586 | 10/1994 |
| JP | 6312612 | 11/1994 |
| JP | 8080825 | 3/1996 |
| JP | 9005352 | 1/1997 |
| JP | 10024819 | 1/1998 |
| JP | 10278762 | 10/1998 |
| JP | 10329682 | 12/1998 |
| JP | 11011272 | 1/1999 |
| JP | 11170992 | 6/1999 |
| JP | 11254992 | 9/1999 |
| JP | 11255093 | 9/1999 |
| JP | 11304663 | 10/1999 |
| JP | 11304662 | 11/1999 |
| SU | 816849 | 3/1981 |
| WO | WO 99/30942 | 6/1999 |

* cited by examiner

ENHANCED SYSTEM FOR YAW STABILITY CONTROL SYSTEM TO INCLUDE ROLL STABILITY CONTROL FUNCTION

RELATED APPLICATIONS

The present invention claims priority to provisional application No. 60/332,063 filed on Nov. 21, 2001.

TECHNICAL FIELD

The present invention relates generally to a control apparatus for controlling a system of an automotive vehicle in response to sensed dynamic behavior, and more specifically, to a method and apparatus for controlling the yaw and roll motion of a vehicle.

BACKGROUND

Dynamic control systems for automotive vehicles have recently begun to be offered on various products. Dynamic control systems typically control the yaw of the vehicle by controlling the braking effort at the various wheels of the vehicle. Yaw control systems typically compare the desired direction of the vehicle based upon the steering wheel angle and the direction of travel. By regulating the amount of braking at each corner of the vehicle, the desired direction of travel may be maintained. Typically, the dynamic control systems do not address roll of the vehicle. For high profile vehicles in particular, it would be desirable to control the rollover characteristic of the vehicle to maintain the vehicle position with respect to the road. That is, it is desirable to maintain contact of each of the four tires of the vehicle on the road.

In vehicle roll stability control, it is desired to alter the vehicle attitude such that its motion along the roll direction is prevented from achieving a predetermined limit with the aid of the actuation from the available active systems such as controllable brake system, steering system and suspension system. Although the vehicle attitude is well defined, direct measurement is usually impossible.

Existing yaw stability control systems may aid in preventing a vehicle from spinning out, and hence may indirectly reduce the potential for the vehicle to have a side collision with a barrier thus reducing the likelihood of a rollover. However, due to different control objectives for yaw stability and roll stability, the standard yaw stability control system will not directly or automatically improve vehicular roll stability. Vehicle tests have shown that the standard yaw stability control system does not react properly to many on-road rollover events. One reason is that the yaw stability control system is intended to regulate both the under-steer and the over-steer of the vehicle such that during driving on abnormal road surface conditions the vehicle can still be controlled by a driver using his driving skills developed for normal road surface conditions. The roll stability control system, however, needs to make the vehicle under-steer more during the detected aggressive driving conditions that may contribute to vehicle roll instability. Intentionally making the vehicle under-steer (as required for roll stability control) and intentionally making the vehicle neutral-steer (as required for yaw stability control) are two different objectives. Notice, however, that if a near-rollover event is caused by an aggressive over-steer, the yaw stability control system might help improve roll stability due to the fact that it brings the vehicle to neutral-steer so as to reduce the amount of vehicle over-steer.

It is therefore desirable to provide an enhanced yaw stability control system such that the traditional yaw stability function is preserved and at the same time the system will directly and properly react to potential vehicular rollover events.

SUMMARY OF THE INVENTION

The present invention is particularly suitable for adding roll stability control capability to a vehicle in the standard vehicle yaw stability control system. This roll stability control function may be implemented in two ways. First, the system may be formed as a removable stand-alone function, or, second, as an integrated function with the yaw stability control strategy.

In one aspect of the invention, a control system for an automotive vehicle has a yaw rate sensor generating a yaw rate signal corresponding to a yawing angular motion of the vehicle body, a lateral acceleration sensor generating a lateral acceleration signal corresponding to a lateral acceleration of a center of gravity of the vehicle body, a steering angle sensor generating a steering angle signal corresponding to a hand-wheel angle, and four wheel speed sensors generating wheel speed signals corresponding to each rotational speed of each of the four wheels of the vehicle. A yaw stability control unit and a roll stability control unit are coupled to the yaw rate sensor, the lateral acceleration sensor, the steering wheel angle sensor, and the wheel speed sensors. The yaw stability control unit and said roll stability control unit determine a respective yaw control signal and a rollover control signal from the yaw angular rate signal, the lateral acceleration signal, the steering wheel angle signal, and the speed signal. An integration unit is coupled to the yaw stability control unit and the roll stability control unit. The integration unit determines a safety system control signal in response to the yaw control signal and the rollover control signal.

In a further aspect of the invention, a method of controlling an automotive vehicle comprises measuring a lateral acceleration of the vehicle body, measuring the yaw rate of the vehicle body, measuring a vehicle speed, which is usually a function of the wheel speed sensor signals and some calculated quantities used as standard variables in a yaw stability control system, measuring a steering wheel angle position of a vehicle hand wheel, determining a yaw control signal and a roll stability control signal as a function of the lateral acceleration, the yaw rate, steering wheel angle and the vehicle speed.

Advantageously, since the on-road roll stability function is achieved by an added control system, there is no hardware change or control structure change for the yaw stability control. The roll stability control function could also be disabled from the standard yaw stability control system through an enabling switch.

Other advantages and features of the present invention will become apparent when viewed in light of the detailed description of the preferred embodiment when taken in conjunction with the attached drawings and appended claims.

DESCRIPTION OF THE PREFERRED EMBODIMENT

Figure 1:
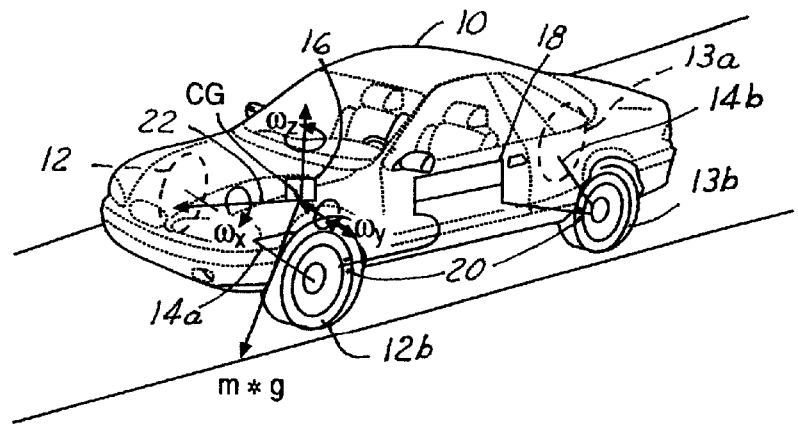
FIG. 1 is a diagrammatic view of a vehicle with variable vectors and coordinator frames according to the present invention.

In the following figures, the same reference numerals will be used to identify the same components. The present invention is preferably used in conjunction with an existing yaw stability control system onto which the functionality of the roll stability control system is desired for a vehicle. Additionally, the present invention may also be used with a deployment device such as airbag. The present invention will be discussed below in terms of preferred embodiments relating to an automotive vehicle moving in a three-dimensional road terrain.

Referring to FIG. 1, an automotive vehicle 10 with a safety system of the present invention is illustrated with various forces and moments thereon. Vehicle 10 has front right and front left tires 12a and 12b, and rear right and left rear tires 13a and 13b, respectively. The vehicle 10 may also have a number of different types of front steering systems 14a and rear steering systems 14b, including having each of the front and rear wheels configured with a respective controllable actuator, the front and rear wheels having a conventional type system in which both of the front wheels are controlled together and both of the rear wheels are controlled together, a system having conventional front steering and independently controllable rear steering for each of the wheels or vice versa. Generally, the vehicle has a weight represented as Mg at the center of gravity of the vehicle, where g=9.8 m/s² and M is the total mass of the vehicle.

As mentioned above, the present invention is preferably used to easily and inexpensively implement a roll stability control system within a yaw stability control system that uses brakes for yaw control. However, the system may also be used with active/semi-active suspension systems, anti-roll bars or other safety devices deployed or activated upon sensing predetermined dynamic conditions of the vehicle.

The sensing system 16 is coupled to a control system 18. The sensing system 16 preferably uses a yaw stability control sensor set that includes a lateral acceleration sensor, a yaw rate sensor, a steering angle sensor and wheel speed sensors. A roll rate sensor and a longitudinal acceleration sensor may also be used, but because the present invention is intended as an addition to a yaw stability control system, no further sensors are required. However, additional sensors may be used for confirmation purposes if desired. The various sensors will be further described below. The wheel speed sensors 20 are mounted at each corner of the vehicle, and the rest of the sensors of sensing system 16 are preferably mounted directly on the center of gravity of the vehicle body, along the directions x,y and z shown in FIG. 1. The angular rates of the car body are denoted about their respective axes as $w_x$ for the roll rate, $w_y$ for the pitch rate and $w_z$ for the yaw rate.

The angular rate sensors and the acceleration sensors are mounted on the vehicle car body along the body frame of reference directions corresponding to the x-y-z axes of the vehicle's sprung mass.

The longitudinal acceleration sensor is mounted on the car body at the center of gravity with its sensing direction along x-axis, its output denoted as $a_x$. The lateral acceleration sensor is mounted on the car body at the center of gravity with its sensing direction along y-axis, and its output denoted as $a_y$.

Figure 2:
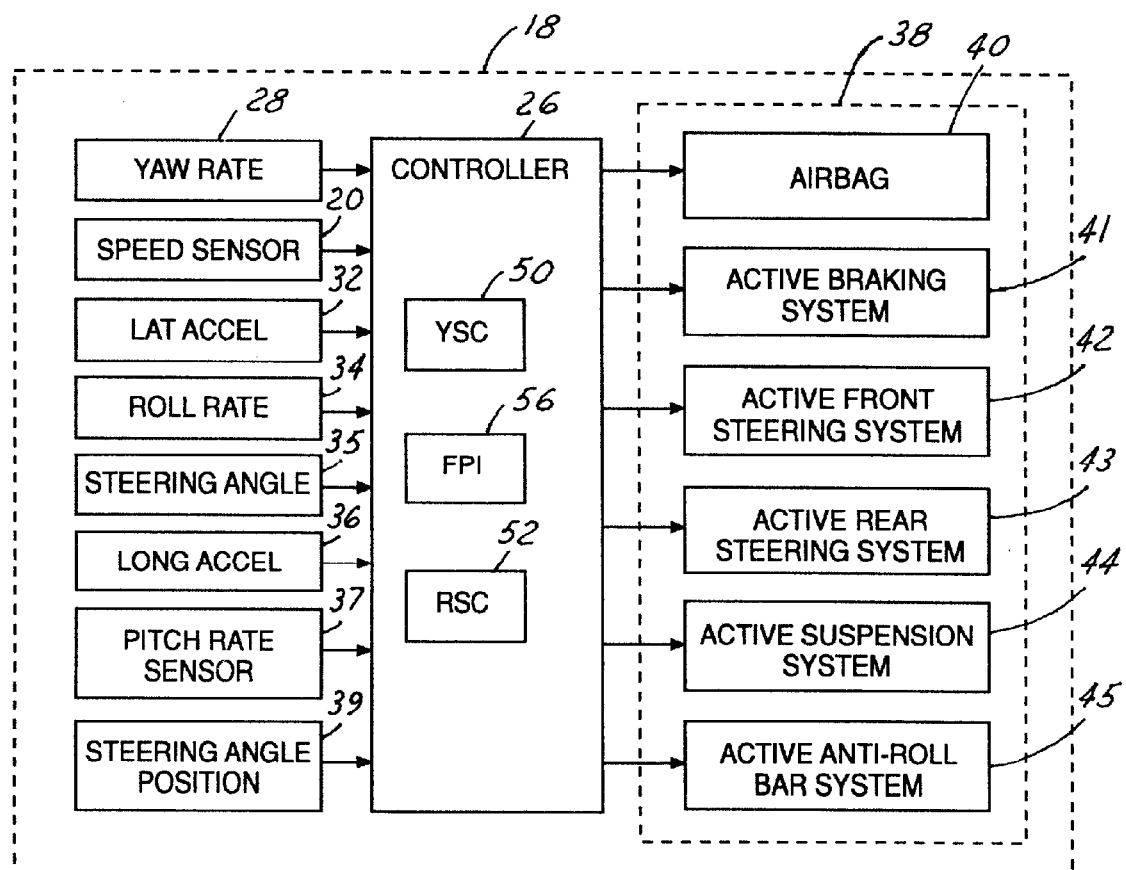
FIG. 2 is a block diagrammatic view of a stability control system according to the present invention.

Referring now to FIG. 2, control system 18 is illustrated in further detail having a controller 26 used for receiving information from a number of sensors which may include a yaw rate sensor 28, a speed sensor 20, a lateral acceleration sensor 32, a roll rate sensor 34, a steering angle sensor (hand-wheel position) 35, a longitudinal acceleration sensor 36, a pitch rate sensor 37 and steering angle actuator position sensor 39.

In the preferred embodiment, only the yaw rate sensor 28, lateral acceleration sensor 32, steering wheel angle sensor 35, and speed sensor 20 are used. That is, the remaining sensors illustrated are not necessary but may be used to form more robust implementations and/or to confirm the measurements of the other sensors.

In the preferred embodiment the sensors are located at the center of gravity of the vehicle. Those skilled in the art will recognize that the sensor may also be located off the center of gravity and translated equivalently thereto.

Lateral acceleration, roll orientation and speed may be obtained using a global positioning system (GPS). Based upon inputs from the sensors, controller 26 may control a safety device 38. Depending on the desired sensitivity of the system and various other factors, not all the sensors 28–39 may be used in a commercial embodiment. Safety device 38 may control an airbag 40, an active braking system 41, an active front steering system 42, an active rear steering system 43, an active suspension system 44, and an active anti-roll bar system 45, or combinations thereof. Each of the systems 40–45 may have their own controllers for activating each one.

Roll rate sensor 34 and pitch rate sensor 37 may sense the roll condition of the vehicle based on sensing the height of one or more points on the vehicle relative to the road surface. Sensors that may be used to achieve this include a radar-based proximity sensor, a laser-based proximity sensor and a sonar-based proximity sensor.

Roll rate sensor 34 and pitch rate sensor 37 may also sense the roll condition based on sensing the linear or rotational relative displacement or displacement velocity of one or more of the suspension chassis components, which may include a linear height or travel sensor, a rotary height or travel sensor, a wheel speed sensor used to look for a change in velocity, a steering wheel position sensor, a steering wheel velocity sensor and a driver heading command input from an electronic component that may include steer by wire using a hand wheel or joy stick.

The roll condition may also be sensed by sensing the force or torque associated with the loading condition of one or more suspension or chassis components including a pressure transducer in an active air suspension, a shock absorber sensor such as a load cell, a strain gauge, the steering system absolute or relative motor load, the steering system pressure of the hydraulic lines, a tire lateral force sensor or sensors, a longitudinal tire force sensor, a vertical tire force sensor or a tire sidewall torsion sensor.

The roll condition of the vehicle may also be established by one or more of the following translational or rotational positions, velocities or accelerations of the vehicle including a roll gyro, the roll rate sensor 34, the yaw rate sensor 28, the lateral acceleration sensor 32, a vertical acceleration sensor, a vehicle longitudinal acceleration sensor, lateral or vertical speed sensor including a wheel-based speed sensor, a radar-based speed sensor, a sonar-based speed sensor, a laser-based speed sensor or an optical-based speed sensor.

Based on the inputs from sensors 28 through 39, controller 26 determines a roll condition and actively controls any one or more of the safety devices 38 such as an airbag 40, an active braking system 41, an active front steering system 42, an active rear steering system 43, an active suspension system 44, and an active anti-roll bar system 45, or combinations thereof. Each of the systems 40–45 may have their own controllers for activating each one of the wheels.

Speed sensor 20 may be one of a variety of speed sensors known to those skilled in the art. For example, a suitable speed sensor may include a sensor at every wheel that is averaged by controller 26. Preferably, the controller translates the wheel speeds into the speed of the vehicle. Yaw rate, steering angle, wheel speed, and possibly a slip angle estimate at each wheel may be translated back to the speed of the vehicle at the center of gravity. Various other algorithms are known to those skilled in the art. For example, if speed is determined while speeding up or braking around a corner, the lowest or highest wheel speed may not be used because of its error. Also, a transmission sensor may be used to determine vehicle speed.

Figure 3:
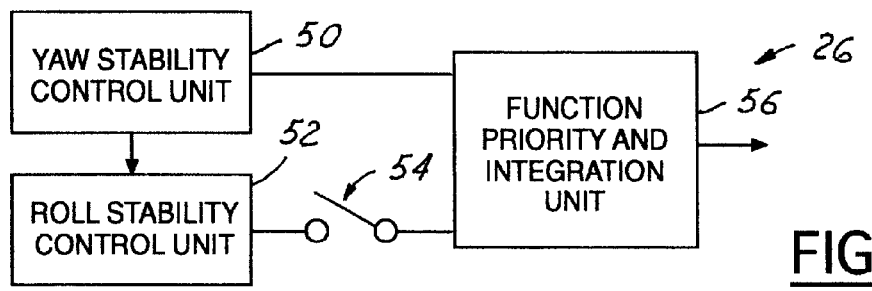
FIG. 3 is a block diagrammatic view of the controller of FIG. 2.
Figure 6:
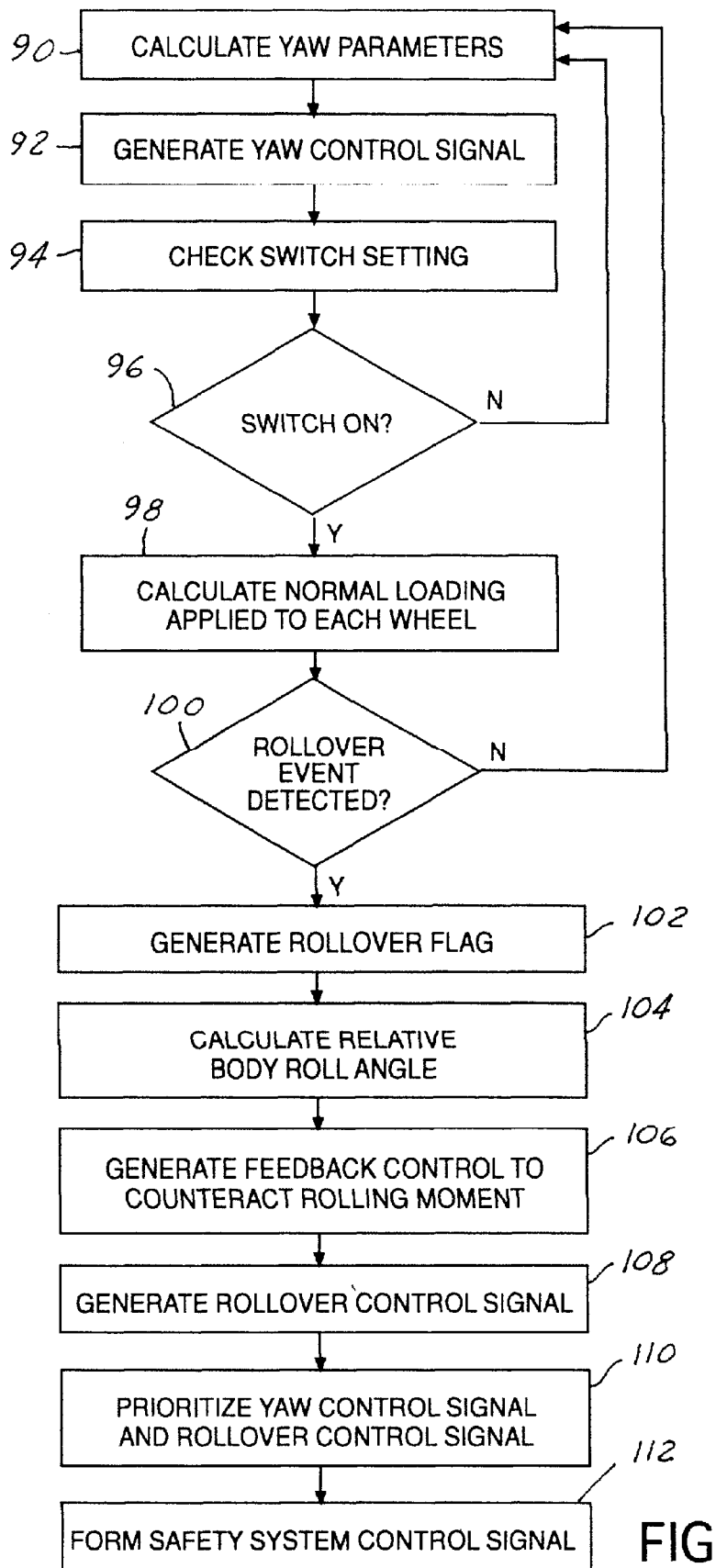
FIG. 6 is flow chart of determination according to the present invention.

Referring now to FIGS. 2, 3 and 6, the present invention provides an enhanced yaw stability control system that will be able to react to both excessive yawing (spinning-out) and impending rollover events. An advantage of this enhanced system is adding an on-road roll stability control function to the standard yaw stability control system, integrating the control strategies for yawing and rolling motion of the vehicle to improve the vehicle handling and safety performances, and a low cost system option, i.e., no extra sensors and actuators are required.

The standard sensor set used in a yaw stability control system includes a yaw rate sensor, a lateral acceleration sensor, wheel speed sensor, and steering wheel position sensor. The control actuation is differential braking of the vehicle wheels. The roll stability control function takes advantage of all the variables measured and calculated in the yaw stability control system. In addition, some roll stability control specific variables are also calculated based on the sensor signals and the available variables calculated in the yaw stability control system.

Controller 26 preferably includes a yaw stability control (YSC) unit 50, a roll stability control (RSC) unit 52, and a function priority and integration (FPI) unit 56. The yaw stability unit 50 generates various signals that are used by the roll stability unit. Also, a switch 54 may couple the roll stability unit to the function, priority and integration unit 56. The switch 54 may be vehicle operator controlled.

Generally, the yaw stability control unit 50 determines the yaw parameters of the vehicle in step 90 and a yaw control signal in step 92 based on the above-mentioned sensors. Various parameters are calculated in the yaw stability control unit such as side slip angle. The roll stability control unit uses some of the calculations such as side slip angle from the yaw stability control unit to determine if the vehicle is rolling over.

Figure 4:
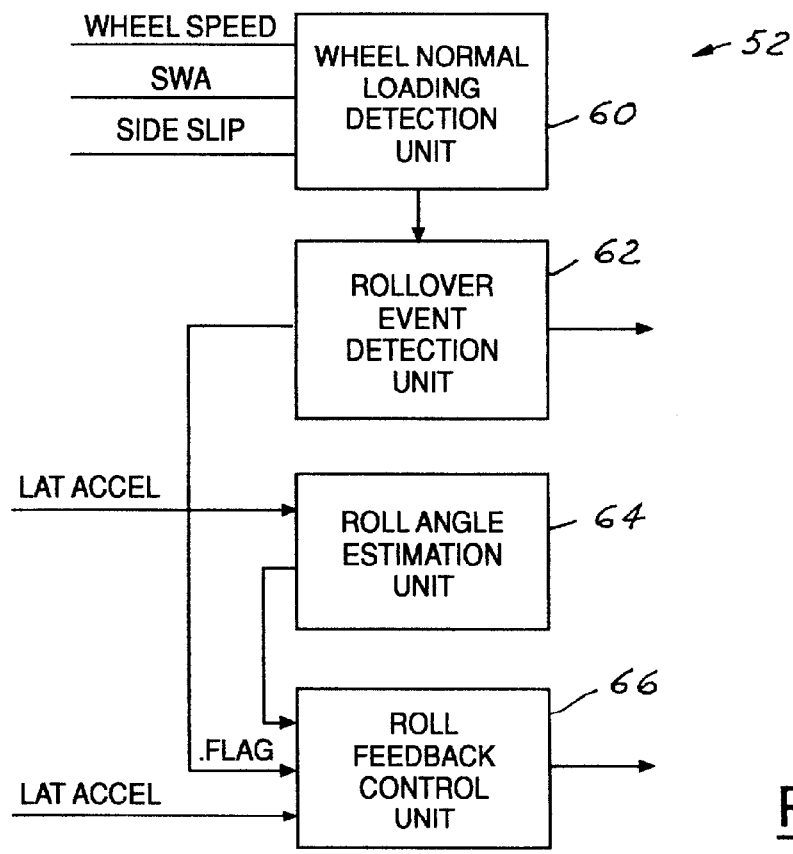
FIG. 4 is a block diagrammatic view of the roll stability control unit of FIG. 3.

Referring now to FIGS. 4 and 6, the roll stability control unit (RSC) 52 further includes the following units: wheel normal loading detection unit (WNL) 60, which estimates the normal loading applied to the tire/wheel assemblies based on the wheel speed sensor signals, the steering angle sensor signal, and the calculated vehicle body side slip angle from yaw stability control system; a rollover event detection unit (RED) 62, which detects if the wheels are lifted by comparing the output from WNL 60 with threshold values; a roll angle estimation unit (RAE) 64, which uses the lateral acceleration sensor signal to estimate the roll angle between the vehicle and the average road surface; and a roll feedback control unit (RFC) 66, which receives the output from RAE 64 to compute the feedback control pressures needed for the control system to regulate the relative roll angle. RFC 66 also receives the lateral acceleration sensor signal and the output from RED to determine if a potential rollover event is occurring, and based on this information control the brakes or other safety device.

The unit first checks the RSC enabling switch 54 in step 94. If this switch is turned off in step 96, the RSC function will be disabled and step 90 will be repeated. If the enabling switch is turned on, a series of processes for achieving roll stability will be conducted beginning in step 98.

WNL detection unit 60 uses the available vehicle side slip angle, the four wheel speed sensor signals and the steering wheel angle to detect the normal loading applied to each wheel in step 98. Let $v_{lf}$, $v_{rf}$, $v_{lr}$ and $v_{rr}$ be the linear velocities of the center of the tire/wheel assemblies at the four corners of a vehicle along the tire longitudinal directions. Those linear velocities can be further related to the vehicle velocity $v_x$ at center of gravity, yaw rate $\omega_z$, the side-slip angle $\beta$ and the steering angle $\delta_s$ as in the following kinematic relationship:

$$v_{lf} = v_x\cos(\beta - \delta_s) - \omega_z\sqrt{l^2 + t_f^2}\cos(\gamma_f + \delta_s) \quad (1.1)$$

$$v_{rf} = v_x\cos(\beta - \delta_s) - \omega_z\sqrt{l^2 + t_f^2}\cos(\gamma_f + \delta_s)$$

$$v_{lr} = v_x(\beta) - \omega_z l$$

$$v_{rr} = v_x\cos(\beta) + \omega_z l$$

where l is the half of the wheel track, $t_f$ is the distance from the vehicle center of gravity to the front axle and the wheel position angle:

$$\gamma_f = \tan^{-1}\left(\frac{l}{t_f}\right)$$

The vehicle side slip angle $\beta$ in the above is a standard variable calculated in yaw stability control system.

If all four wheels of the vehicle are contacting the road surface, then based on the kinematics relationship between the rolling radius, the velocity and the rotational speed is:

Linear_Velocity=Rotational_Speed*Rolling_Radius (1.2)

Hence, the rolling radius of the four wheels can be computed if all the wheels do not have significant slip $$R_{lf} = \frac{v_x\cos(\beta - \delta_s) - \omega_z\sqrt{l^2 + t_f^2}\cos(\gamma_f + \delta_s)}{\omega_{lf}} \quad (1.3)$$

$$R_{rf} = \frac{v_x\cos(\beta - \delta_s) + \omega_z\sqrt{l^2 + t_f^2}\cos(\gamma_f + \delta_s)}{\omega_{rf}}$$

$$R_{lr} = \frac{v_x\cos(\beta) - \omega_z l}{\omega_{lr}}$$

$$R_{rr} = \frac{v_x\cos(\beta) + \omega_z l}{\omega_{rr}}$$

where $\omega_{lf}, \omega_{rf}, \omega_{lr}$ and $\omega_{rr}$ are the angular velocities of the four wheels measured by the wheel speed sensors.

Let $N_{lf0}, N_{rf0}, N_{lr0}$ and $N_{rr0}$ be the respective normal loading of the left-front, right-front, left-rear and right-rear wheels under normal driving and loading condition, and $R_{lf0}, R_{rf0}, R_{lr0}$ and $R_{rr0}$ the corresponding rolling radius. Then the total loading in the wheels can be expressed as:

$$N_{lf}=N_{lf0}+k_f(R_{lf}-R_{lf0})$$

$$N_{rf}=N_{rf0}+k_f(R_{rf}-R_{rf0})$$

$$N_{lr}=N_{lr0}+k_r(R_{lr}-R_{lr0})$$

$$N_{rr}=N_{rr0}+k_r(R_{rr}-R_{rr0}) \qquad (1.4)$$

where $k_f$ and $k_r$ are the front and rear tire stiffness constants. Notice that the above calculated normal loadings are valid when the vehicle wheels does not have significant longitudinal slip. This is usually true when the four wheels are contacting the road surface. In the case of rollover, one or two wheels at one side of the vehicle will be lifted and thus may not be contacting the road. In this case, the calculated normal loadings in (1.4) are no longer valid. However, if in this case there are small amounts of braking pressure sent to the lifted wheel or wheels, the braking pressure might well lock the wheel or wheels. For example, assume the front-left wheel is up in the air, and a active detecting pressure is sent to that wheel. Then the calculated variable $R_{lf}$ in (1.3) will become a very large number. Hence, in this case the calculated $N_{lf}$ will be very large. If the left-front wheel is not up in the air, the small amount of braking pressure will not generate significant slip on this wheel, and the calculated value $N_{lf}$ will be within a normal range. Hence, with proper thresholds the above calculated normal loadings can be used to identify when a potential rollover is happening (together with sending a small amount of braking pressure to the proper wheel). In step 100, a rollover event is determined based on the above abnormal normal loading detection or the other wheel lifting detection strategies. This wheel lifting strategy, called active wheel lifting detection, can be summarized as in the following logic for the front wheels
if roll angle $>\theta$
    start active wheel lift detection cycle by sending a small amount of pressure to front-left brake;
    compute normal loading $N_{lf}$;
if $N_{lf}>\pi_{lf}$
    the front-left wheel is lifted;
    set wheel lift flag to 1;
else
    set wheel lift flag to 0
if roll angle $<-\theta$
    start active wheel lift detection cycle by sending a small amount of pressure to front-right brake;
    compute normal loading $N_{lf}$;
if $N_{rf}>\pi_{rf}$
    the front-right wheel is lifted;
    set wheel lift flag to 1;
else
    set wheel lift flag to 0
where $\theta$ is the threshold for vehicle roll angle. $\pi_{lf}$ and $\pi_{rf}$ are the thresholds for the abnormal normal loading due to the lifted front-left and lifted front-right wheels. The similar strategy can be easily extended to the rear wheels. The vehicle roll angle will be calculated later.

If a rollover event is not detected in step 100 step 90 is repeated. If a rollover event is detected, the rollover event detection (RED) unit 62 sends out a flag signal in step 102 to indicate potential rollover based on several or some logic of the following occurrences: wheel normal loading unit (WNL) 60 detects significant abnormal wheel normal loading, i.e., the wheel lift flag is set to 1; the vehicle lateral acceleration exceeds a threshold value; the desired roll moment, which will be calculated later, to counteract the rollover motion exceeds certain threshold value; the other wheel lifting detection logic indicate a potential wheel lift.

The roll angle estimation unit 64 is used to determined the vehicle body roll angle in step 104 with respect to the average road on which the vehicle is traveling. That is, the magnitude of the relative roll angle as $\theta_x$ is determined. More specifically, the relative roll angle can be determined through balancing the moments applied to the vehicle body. There are two moments applied to the vehicle body along the roll direction of the vehicle: the roll moment due to the vertical suspension strokes and the roll moment due to the lateral tire forces. If we denote the total vehicle suspension roll spring rate as $K_{roll}$ and the total vehicle suspension roll damping rate as $D_{roll}$, then the moment induced by the vertical suspension forces can be written as $$M_{susp}=K_{roll}\theta_x+D_{roll}\dot{\theta}_x$$

The total lateral force applied to the vehicle body is generated from the lateral tire forces through suspensions. This total lateral force generates a lateral acceleration, which is measured by the acceleration sensor mounted on the center of gravity of the vehicle body. Let $a_y$ be the lateral acceleration of the vehicle body center of gravity, $M_s$ as the vehicle sprung mass, then the moment applied to the vehicle body due to lateral tire forces can be expressed as $$M_{latforce}=M_s a_y h_{cg}$$

where $h_{cg}$ is the vertical displacement of the center of gravity of vehicle body with respect to the floor of the vehicle. By making $M_{latforce}=M_{susp}$, the relative roll angle can be related to the lateral acceleration as in the following relationship through Laplace transfer function $$\theta_x(s) = \frac{M_s h_{cg}}{K_{roll} + D_{roll}s}$$

A digital implementation of the above can be obtained as the following $$\theta_x(k+1)=d(k)*\theta_x(k)+n(k)*a_y(k+1)$$

where the filtering coefficients are updated based on the magnitude of the lateral acceleration to reflect the nonlinear suspension spring rate and suspension damping $$n(k) = \begin{cases} n_1 \text{ if } |a_y(k)| \leq A_1 \\ n_2 \text{ if } A_1 < |a_y(k)| \leq A_2 \\ n_3 \text{ if } |a_y(k)| > A_2 \end{cases}$$

$$d(k) = \begin{cases} d_1 \text{ if } |a_y(k)| \leq B_1 \\ d_2 \text{ if } A_1 < |a_y(k)| \leq B_2 \\ d_3 \text{ if } |a_y(k)| > B_2 \end{cases}$$

where $A_1, A_2$ are the thresholds used to divide the regions for the lateral acceleration such that different suspension spring rate can be used for calculating the relative roll angle. $B_1, B_2$ are the thresholds used as the same purpose for suspension damping rates.

The roll feedback control unit 66 calculates a feedback control command in step 106 to drive the controlled brakes (or other safety device) such that the brake actuation could generate the desired counteracting rolling moments. The feedback control is used to generate the rollover control signal in step 108 in response to the relative roll angle signal.

If the sequential difference of the relative roll angle $\theta_x$ is defined as:

$$\Delta\theta_x(k)=\theta_x(k)-\theta_x(k-1)$$

then a feedback control could be written as the following $$u(k) = u(k-1) + K_p(k)\Delta\theta_x(k) + K_I(k)\theta_x(k) + \\ K_D(k)[\Delta\theta_x(k) - \Delta\theta_x(k-1)] + \\ K_{DD}(k)[\Delta\theta_x(k) - 2\Delta\theta_x(k-1) + \Delta\theta_x(k-2)] \quad (1.5)$$

where $K_p, K_I, K_D$ and $K_{DD}$ are the adaptive proportional, integral, derivative and double derivative control gains. They might be scheduled based on the magnitude of the lateral acceleration signal and the roll acceleration, the rate change of steering angle, the yaw rate sensor signal, the roll rate sensor signals, the dynamics of the hydraulic brake system or an electro-hydraulic brake system.

Figure 5:
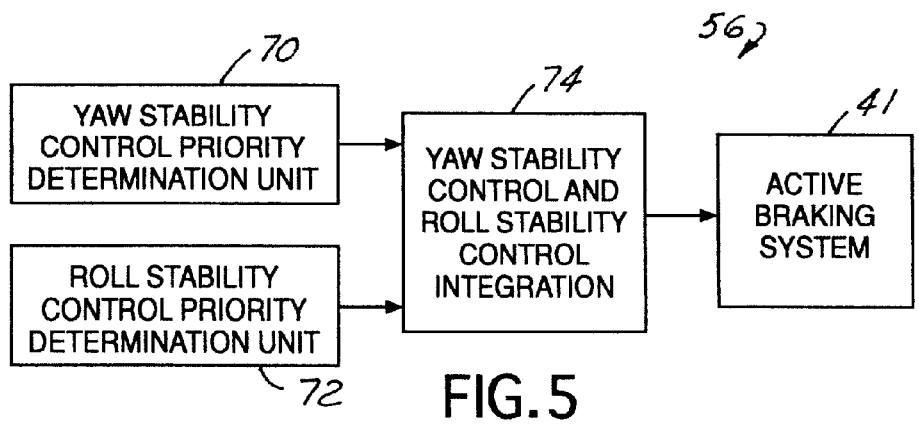
FIG. 5 is a block diagrammatic view of the function priority and integration limit of FIG. 3.

Referring now to FIGS. 5 and 6, the FPI unit 56 provides a function priority and integration to balance the yaw stability control demand (yaw control signal) and the roll stability control demand (roll stability control signal) in order to maximize the benefit and minimize the counteracting effects between the two functions. Three units as shown in the following will be used to achieve this: a yaw stability control priority determination unit (YSCP unit) 70, a roll stability control priority determination unit (RSCP unit) 72, a yaw stability control and roll stability control integration (YRSCI unit) 74. In addition, the active braking system 41 is used to generate brake pressure commands.

The YSC priority determination unit 70 prioritizes the yaw control signal based upon the severity measured from the sensors.

The RSC priority determination unit 72 prioritizes the roll stability control signal based upon the severity from the sensors. The functions of units 70 and 72 are shown in step 110.

The YRSC integration unit 74 receives the prioritized signals and generates a safety control signal therefore in step 112. The weighting of each signal depends on various factors specific to each vehicle. In some instances the yaw stability control signal may compete with the roll stability control signal. In such a case, roll stability control may be given a higher priority. In other conditions, the yaw stability control signal and roll stability control signal may be remedied in the same manner. The prioritization is obtained experimentally for each vehicle model, which is a function of the vehicle dynamic and static parameters.

While particular embodiments of the invention have been shown and described, numerous variations and alternate embodiments will occur to those skilled in the art. Accordingly, it is intended that the invention be limited only in terms of the appended claims.

What is claimed is:

1. A control system for an automotive vehicle having a vehicle body comprising:
    a yaw rate sensor generating a yaw rate signal corresponding to a yawing angular motion of the vehicle body;
    a lateral acceleration sensor generating a lateral acceleration signal corresponding to a lateral acceleration of a center of gravity of the vehicle body;
    a steering angle sensor generating a steering angle signal corresponding to a hand wheel angle;
    a plurality of wheel speed sensors generating wheel speed signals corresponding to each four wheel speed of the vehicle; and
    a yaw stability control unit and a roll stability control unit coupled to said yaw rate sensor, said lateral acceleration sensor, said steering wheel angle sensor and said plurality of wheel speed sensors, said yaw control unit and said roll stability control unit determining a respective yaw stability control signal and a roll stability control signal from the yaw angular rate signal, the lateral acceleration signal, the steering wheel angle signal, and the wheel speed signals; and
    an integration unit coupled to the yaw stability control unit and the roll stability control unit, said integration unit determining a safety system control signal in response to the yaw stability control signal and the roll stability control signal.

2. A system as recited in claim 1 wherein the roll stability control unit comprises a wheel normal loading detection unit generating a wheel lift signal.

3. A system as recited in claim 2 wherein said wheel normal loading detection unit generates a wheel loading signal in response to vehicle velocity, yaw rate, slip angle and steering wheel angle during an active wheel lifting detection cycle.

4. A system as recited in claim 3 wherein said roll stability control unit comprises a rollover event detection unit generating a flag in response to said wheel loading signal or the wheel lift signal.

5. A system as recited in claim 4 wherein said roll stability control unit comprises a roll angle estimation unit generating a relative roll angle signal.

6. A system as recited in claim 5 wherein said roll stability control unit comprises a roll feedback control unit generating the roll stability control signal in response to the roll angle signal.

7. A system as recited in claim 1 further comprising a switch for decoupling said yaw stability control unit and the roll stability control unit.

8. A system as recited in claim 1 further comprising a safety system receiving said safety system control signal.

9. A system as recited in claim 8 wherein said safety system comprises a brake system.

10. A system as recited in claim 9 wherein said brake system comprises a brake pressure command generation unit generating a brake command in response to said safety signal.

11. A system as recited in claim 10 wherein said brake command comprises a right front brake command, a right rear brake command, a left front brake command, and a left rear brake command.

12. A control system as recited in claim 5 wherein said safety system comprises an active rear steering system.

13. A control system as recited in claim 8 wherein said safety system comprises an active front steering system.

14. A control system as recited in claim 8 wherein said safety system comprises an active anti-roll bar system.

15. A control system as recited in claim 8 wherein said safety system comprises an active suspension system.

16. A system as recited in claim 1 wherein the roll stability control unit and the yaw stability control unit are distinct.

17. A method of controlling an automotive vehicle comprising:
    measuring a lateral acceleration of the vehicle body;
    measuring the yaw rate of the vehicle body;
    measuring a vehicle speed;

measuring a steering wheel angle position of a vehicle hand wheel;

determining a yaw control signal and a roll stability control signal as a function of the lateral acceleration, the yaw rate, steering wheel angle and the vehicle speed;

generating a safety system control signal as a function of the roll stability control signal and the yaw stability control signal; and activating a safety device in response to said safety system control signal.

18. A method as recited in claim 17 wherein said step of activating a safety device comprises one selected from the group consisting of an active brake control system, an active rear steering system, an active front steering system, an active anti-roll bar system, and an active suspension system.

19. A method as recited in claim 17 wherein determining a roll stability control signal comprises generating a wheel lift flag in response to a wheel normal loading signal during an active wheel detection cycle.

20. A method as recited in claim 19 wherein determining a normal wheel loading comprises determining a normal wheel loading in response to a rolling radius.

* * * * *